(12) United States Patent
Yuan

(10) Patent No.: US 12,205,235 B2
(45) Date of Patent: Jan. 21, 2025

(54) METHOD AND SYSTEM FOR DEFINING AN OUTLINE OF A REGION IN AN IMAGE HAVING DISTORTED LINES

(71) Applicant: Axis AB, Lund (SE)

(72) Inventor: Song Yuan, Lund (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 18/355,784

(22) Filed: Jul. 20, 2023

(65) Prior Publication Data
US 2024/0054598 A1    Feb. 15, 2024

(30) Foreign Application Priority Data
Aug. 15, 2022    (EP) .................................. 22190416

(51) Int. Cl.
G06T 3/047    (2024.01)
G06T 11/20    (2006.01)
G06T 15/00    (2011.01)

(52) U.S. Cl.
CPC ............ *G06T 3/047* (2024.01); *G06T 11/203* (2013.01); *G06T 15/00* (2013.01); *G06T 2200/24* (2013.01); *G06T 2210/12* (2013.01)

(58) Field of Classification Search
None
See application file for complete search history.

(56) References Cited

U.S. PATENT DOCUMENTS 7,366,359 B1    4/2008 Davey et al.
8,145,007 B2    3/2012 Davey et al.
(Continued)

FOREIGN PATENT DOCUMENTS

JP    2014-042160 A    3/2014
JP    2022-020297 A    2/2022
(Continued)

OTHER PUBLICATIONS

Open Source Computer Vision, "Fisheye camera model—Camera Calibration and 3D Reconstruction," https://docs.opencv.org/3.4/db/d58/group_calib3d_fisheye.html, Available at: http://web.archive.org/web/20200714022506/https://docs.opencv.org/3.4/db/d58/group_calib3d_fisheye.html (Jul. 14, 2020).
(Continued)

*Primary Examiner* — Jeffrey J Chow
(74) *Attorney, Agent, or Firm* — Volpe Koenig

(57) ABSTRACT

A method for defining an outline of a region in an image having distorted lines comprises displaying a first image version having distorted lines, wherein lines in a first image portion of the first version have a reduced distortion, receiving user input defining a first outline portion of the outline of region in the first version, wherein the first outline portion includes one or more lines in the first image portion of the first version, displaying a further version of the image having distorted lines, wherein lines in a further image portion of the further version have a reduced distortion, and receiving user input defining a further outline portion of the outline of the region in the further, wherein the further outline portion includes one or more lines in the further portion of the further version.

16 Claims, 4 Drawing Sheets

(56) References Cited

U.S. PATENT DOCUMENTS

2010/0165104 A1* 7/2010 Fujita .................. G06T 5/80
348/148
2014/0010474 A1* 1/2014 Lee ..................... G06T 5/80
382/275
2016/0330384 A1* 11/2016 Park .................... H04N 5/2628

FOREIGN PATENT DOCUMENTS

| KR | 20120008827 A | 2/2012 |
| KR | 20210037778 A | 4/2021 |
| WO | 2016/185522 A1 | 11/2016 |
| WO | 2020/080101 A1 | 4/2020 |

OTHER PUBLICATIONS

Open Source Computer Vision, "Images Warping—Images stitching," https://docs.opencv.org/4.x/d0/dfa/group_stitching_warp.html, Available at: http://web.archive.org/web/20220516074318/https://docs.opencv.org/4.x/d0/dfa/group__stitching_warp.html (May 16, 2022).

* cited by examiner

METHOD AND SYSTEM FOR DEFINING AN OUTLINE OF A REGION IN AN IMAGE HAVING DISTORTED LINES

FIELD OF INVENTION

The present disclosure relates to the field of defining outlines in images. In particular, it relates to a method and a system for defining an outline of a region in an image having distorted lines.

TECHNICAL BACKGROUND

In video surveillance applications it is common that a user wants to define a region in video images of a monitored scene. To mention a few examples, the region may be a zone in which alarms should or should not be triggered if trespassed, a region which should be provided with a privacy mask, or a region in which loitering or objects should be detected.

A user may define such a region by drawing the outline of the region in a displayed video image. Easiest for the user is to define the outline by defining a number of lines which together make up the outline of the region. This is also what is offered by commercially available tools. In addition to being easy, it is often the case that the desired region follows straight lines in the scene, such as fences defining the border of an alarm zone or a window which should be privacy masked.

However, a problem appears when the outline of a region is to be defined in an image in which lines are distorted, such as in a panoramic image. A panoramic image may for example be generated by capturing an image through a wide-angle lens. In that case, the lens causes lines which in reality are straight to appear curved in the resulting image. In another example, a panoramic image may be generated by stitching together a plurality of images which capture the scene from different viewing angles. In that case, the images are typically in a first step projected onto a common three-dimensional surface where they are stitched together. In a subsequent step the stitched image represented on the three-dimensional surface is mapped onto a two-dimensional image plane to enable display on a regular monitor. As a consequence of the mapping, lines that were straight in the stitched image on the three-dimensional surface will appear distorted, i.e., curved in resulting panoramic image. As a result, the outline of the desired region will typically include arced segments rather than straight lines. Therefore, a user cannot simply define the outline of the desired region by drawing straight lines in the image, and tracing an arced segment along a region is inherently cumbersome. There is therefore a need for methods which simplify the definition of outlines in images having distorted lines.

SUMMARY

In view of the above, it is thus an object of the present disclosure to mitigate the above problems and provide a method and a system which simplifies the definition of outlines in images having distorted lines.

This object is achieved by the attached independent claims. Example embodiments are given by the attached dependent claims.

According to a first aspect, there is provided a method for defining an outline of a region in an image having distorted lines. The method comprises displaying a first version of an image having distorted lines, wherein lines in a first image portion of the first version of the image have a reduced distortion, receiving user input defining a first outline portion of the outline of region in the first version of the image, wherein the first outline portion includes one or more lines in the first image portion of the first version of the image, displaying a further version of the image having distorted lines, wherein lines in a further image portion of the further version of the image have a reduced distortion, and receiving user input defining a further outline portion of the outline of the region in the further version of the image, wherein the further outline portion includes one or more lines in the further image portion of the further version of the image.

With this method, the outline of the region is hence defined by successively defining outline portions in different versions of the image. The different versions of the image differ in that the distortion of lines is reduced in different image portions. Thus, the first version of the image has a reduced distortion in a first image portion, which facilitates the input of an outline portion in the first image portion in the form of straight lines. The second version of the image instead has a reduced distortion in a second image portion, which facilitates the input of an outline portion in the second image portion in the form of straight lines. Accordingly, by successively displaying different versions of the image having reduced line distortion in different portions thereof, the definition of the outline by drawing straight lines in the image is made possible.

The first and the further version(s) of the image having distorted lines are generated from the same image data, i.e., from the same pixel values, and are therefore versions of the same image. However, the positions of the pixels in the first version of the image and in the further version(s) of the image are spatially displaced with respect to each other. The first and the further version(s) of the image may therefore be said to be spatially transformed versions of the same image. In particular, the further version of the image may be said to be a spatially transformed version of the first version of the image. By a spatial transformation of an image is meant that the pixel locations in the image are subject to a spatial transformation which maps them to corresponding pixel locations in the spatially transformed version of the image.

Both the first and the further version of the image have distorted lines. However, they will have a reduced line distortion in different image portions. By lines in an image portion of an image having a reduced distortion is meant that they have a reduced, or lower, distortion of lines compared to other portions of the image. By lines being distorted refers to the fact that lines which are straight in the scene are depicted as curved in the image. When the distortion of a line is reduced, one may hence say that it is rectified or straightened.

It is further understood that at the end of the method, the outline of the region will be composed of the defined outline portions.

The method may further comprise repeating the steps of displaying a further version of the image and receiving user input defining a further outline portion of the outline of the region until the outline of the region is completely defined. In this way, the user is allowed to successively define outline portions in different versions of the image until the user considers the outline to be complete. The outline may be considered completely defined when the user provides input in that respect. Alternatively, or additionally, the outline of the region may be considered complete when it defines an enclosed region, such as when the start point of the first outline portion and the end point of the last input outline portion meet such that a closed outline is obtained.

In example embodiments, the first version of the image has a reduced distortion of lines along a first horizontal line in the first version of the image and the further version of the image has a reduced distortion of lines along a further horizontal line in the further version of the image. Accordingly, the first image portion may extend along a first horizontal line in the first version of the image, and the further image portion may extend along a further horizontal line in the further version of the image. It may hence be said that the first version of the image has a straightened horizon along the first horizontal line and the further version of the image has a straightened horizon along the further horizontal line. This is particularly advantageous for panoramic images which typically are subject to line distortion except along a horizontal line referred to as 'the horizon' which may be set by a user.

Displaying the first version of the image may be made in response to receiving a user input indicative of the first image portion, and displaying the further version may be made in response to receiving a user input indicative of the further image portion. In this way, the user may successively define in which image portion the next displayed image version should have a reduced line distortion.

The method may further comprise transforming the first outline portion defined in the first version of the image using a transformation between the first version of the image and the further version of the image. The transformation refers to a spatial transformation between pixel locations in the image plane of the first version of the image and the image plane of the further version of the image. This allows calculation of the pixel locations of the first outline portion in the image plane of the further version of the image. Further, it enables displaying the transformed first outline portion together with the further version of the image. In this way, as the user is presented with new versions of the image, the previously input output portions will move along and successively be presented with the new image versions. This improves the user experience as it facilitates for the user to get an overview of the outline defined so far.

The method may further comprise merging the transformed first outline portion and the further outline portion defined in the further version of the image into a common representation of the outline in the further version of the image. Thus, outline portions may successively be merged into a common representation as they are input.

The first outline portion defined in the first version may be represented by a first plurality of points, and the first outline portion is transformed by transforming the first plurality of points using the transformation. Representing an outline portion in terms of a number of spatial points along the outline is a memory efficient way of describing the outline portion. Often a few points along each line segment are enough. It further allows the outline portion to be spatially transformed from the image plane of one image version to the image plane of another image version at a low computational cost since only the location of the points needs to be spatially transformed.

Alternatively, the first outline portion may instead be transformed by applying the transformation to a rendered first overlay image of the first outline portion defined in the first version of the image. This allows the outline portion to be spatially transformed from the image plane of one image version to the image plane of another image version. This option could be used when a point representation of the first outline portion is not available.

The method may further comprise displaying the first outline portion together with the first version of the image, and displaying the further outline portion together with the further version of the image.

In example embodiments, the first version and the further version of the image are both panoramic images. In some examples, the first version and the further version of the image are obtained by mapping an image represented on a three-dimensional surface onto a two-dimensional image plane using a first mapping function and a further mapping function, respectively. The three-dimensional surface may be a sphere or a cylindrical surface onto which a plurality of images captured by a panoramic camera has been projected in order to stitch the images together. In other examples, the first and the further version of the image are obtained by dewarping a cutout of a wide-angle image using a first and a further dewarping function, respectively. The wide-angle image may, for instance, be captured by a wall-mounted camera through a wide-angle lens.

The region in the image may be used as an include or exclude zone for alarms, privacy masking, loitering detection and/or object detection. Other applications of the region may also be envisaged.

According to a second aspect of the disclosure, the above object is achieved by a system for defining an outline of a region in an image having distorted lines.

According to a third aspect of the disclosure, the above object is achieved by a (non-transitory) computer-readable medium comprising computer-code instructions which, when executed by a processing device, causes the processing device to carry out the method of the first aspect.

The second and third aspects may generally have the same features and advantages as the first aspect. It is further noted that the disclosure relates to all possible combinations of features unless explicitly stated otherwise.

BRIEF DESCRIPTION OF THE DRAWINGS

The above, as well as additional objects, features and advantages of the present disclosure, will be better understood through the following illustrative and non-limiting detailed description of embodiments of the present disclosure, with reference to the appended drawings, where the same reference numerals will be used for similar elements, wherein.

DETAILED DESCRIPTION

The present disclosure will now be described more fully hereinafter with reference to the accompanying drawings, in which embodiments of the disclosure are shown. The systems and devices disclosed herein will be described during operation.

Figure 1:
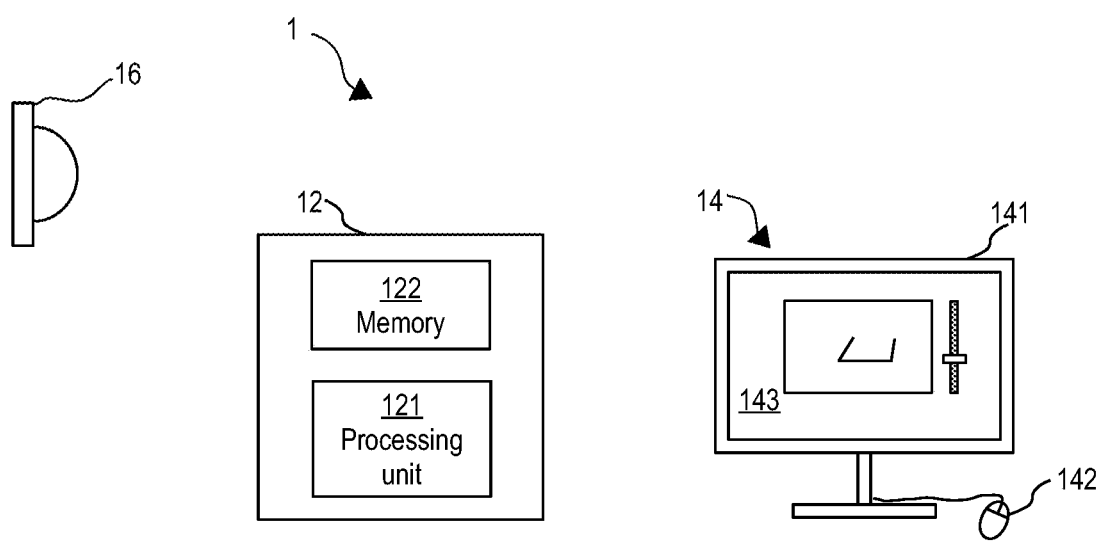
FIG. 1 schematically illustrates a system for defining an outline of a region in an image having distorted lines according to embodiments.

FIG. 1 illustrates a system 1 for defining an outline of a region in an image having distorted lines. The system 1 comprises a processing unit 121 and a user interface 14. The processing unit 121 is operatively connected to the user interface 14 via a wired or a wireless connection.

The processing unit 121 may be arranged to operate in association with a memory 122. The processing unit 121 and the memory 122 may be part of a processing device 12. The memory 122 may act as a non-transitory computer-readable medium which stores computer-code instructions which are executed by the processing unit 121. In particular, the computer-code instructions may cause the processing unit 121 to carry out any method disclosed herein.

The user interface 14 includes a display 141 on which images produced by the processing unit 121 may be displayed. The user interface 14 further include a user input device 142, such as a computer mouse, a touch-sensitive screen, or similar, which allows the user to provide user input in relation to the displayed images. The user input is communicated to the processing unit 121. To facilitate user interaction, the user interface 14 may implement a graphical user interface 143 via which images are displayed to the user, and via which the user may define an outline of a region in the displayed images. In particular, the graphical user interface 143 may be configured to allow the user to define portions of the outline, e.g., by drawing one or more lines in the displayed image. The graphical user interface 143 may further allow the user to indicate an image portion of the image, such as an image portion which extends along a horizontal line in the image. In the illustrated example, the graphical user interface 143 includes a slider bar which allows the user to indicate a vertical level or coordinate of a horizontal line. In response to receiving the indication of the image portion of the image, the currently displayed image may be transformed to reduce the distortion of lines in the image portion. Specifically, the distortion of lines may be reduced along the indicated horizontal line.

The system 1 may be arranged to receive images from a camera 16. The camera 16 may be a video camera which produces a video sequence of panoramic images. In some embodiments, the processing unit 121 and the memory 122 are arranged in the camera 16, while in other embodiments they are arranged outside of the camera 16, such as in a video management system.

Figure 2:
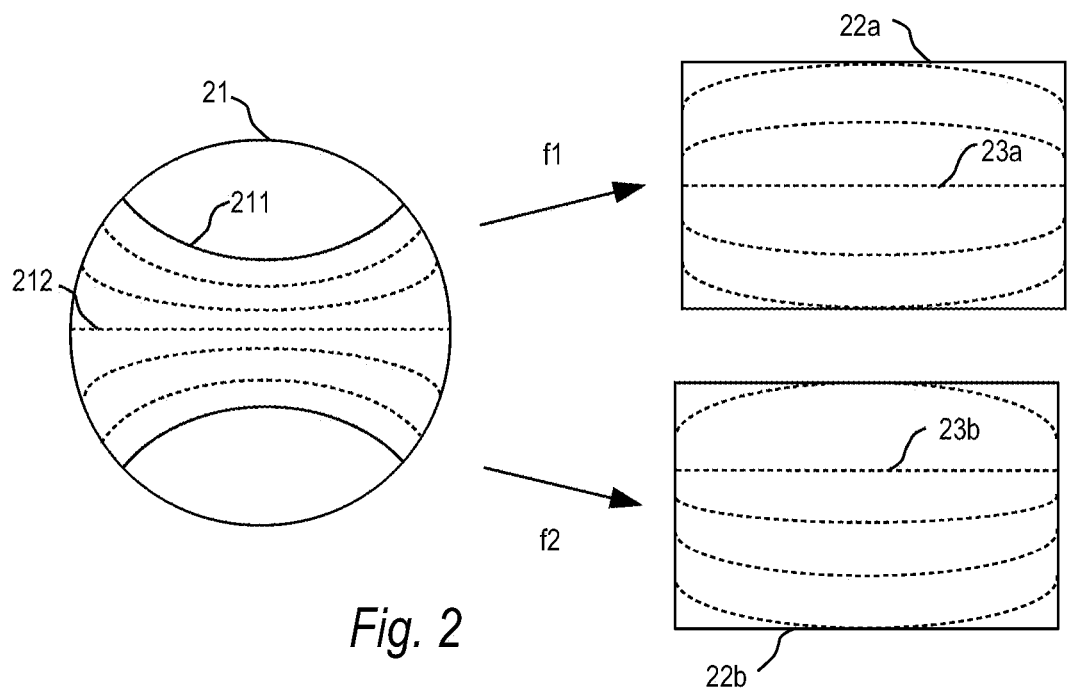
FIG. 2 schematically illustrates dewarping of a wide-angle image using different dewarping functions according to embodiments.

In one example, illustrated in FIG. 2, the camera 16 captures images of the scene by using a wide-angle lens, such as a fish-eye lens. As a result, the camera 16 produces a wide-angle image 21 of the scene. The wide-angle image 21 is represented on a two-dimensional image plane and typically has a circular shape. The wide-angle image 21 is distorted, or warped, in the sense that straight lines in the scene will be curved in the wide-angle image 21 due to light being by refracted by the wide-angle lens. The processing unit 121 may generate a panoramic image 22 having an essentially rectangular shape from the wide-angle image 21. In particular, it may generate the panoramic images 22a, 22b from a cutout 211 of the wide-angle image 21. For a camera 16 which is arranged to provide a side-view of the monitored scene, such as a wall-mounted camera, the cutout 211 may be formed from those pixels in the wide-angle image 21 that depict scene points within a certain angular range above and below a horizontal center line 212 of the camera 16. In one example, the angular range may cover scene points located from 80 degrees below the horizontal center line 212 to 60 degrees above the horizontal center line. As illustrated in FIG. 2, such a cutout 211 essentially has the shape of an hourglass which lies down. Each of the dashed lines in FIG. 2 corresponds to points in the scene being located at a certain angle above or below the horizontal center line 212 of the camera 16.

In order to generate the panoramic images 22a, 22b, the processing unit 121 may apply a transformation, referred to herein as a dewarping function f1, f2 to the cutout 211. Each of the dewarping functions f1, f2 is a spatial mapping between spatial points or pixel locations in the cutout 211 to spatial points or pixel locations in the rectangular image plane of the panoramic images 22a, 22b. Depending on which dewarping function is used, the distortion of lines may be reduced in different image portions of the resulting panoramic image 22a, 22b. In particular, in the examples illustrated in FIG. 2, the choice of the dewarping function f1, f2 influences the horizontal line 23a, 23b in the panoramic image 22a, 22b at which there will be a reduced distortion of lines. In the panoramic image 22a, the distortion of lines is reduced in an image portion extending along a first horizontal line 23a, here located in the center of the panoramic image 22a, while in panoramic image 22b, the distortion of lines is reduced in an image portion extending along a further horizontal line 23b which in the example is above the center of the panoramic image 22b. How to implement and construct a dewarping function which reduces the distortion of lines in a certain image portion is per se known to the skilled person and is therefore not described in more detail herein. For example, the "Fisheye camera model"-library in OpenCV may be used (https://docs.opencv.org/3.4/db/d58/group_calib3d_fisheye.html).

In a practical implementation, a look-up table may be constructed which specifies which dewarping function to use in order to reduce line distortion in a given image portion, such as along a given horizontal line. The dewarping function may be specified in terms of parameters of a parametric dewarping function.

Figure 3:
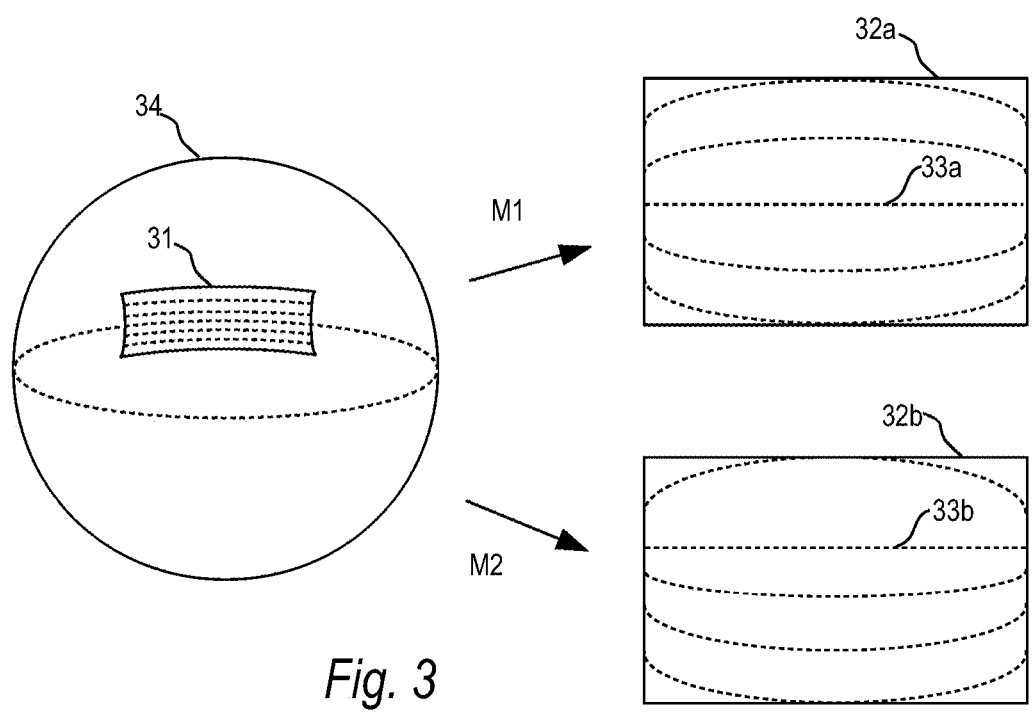
FIG. 3 schematically illustrates mapping an image represented on a three-dimensional surface onto a two-dimensional image plane using different mapping functions according to embodiments.

In another example, illustrated in FIG. 3, the image is a panoramic image 32a, 32b obtained by mapping an image 31 represented on a three-dimensional surface 34, such as a spherical surface or a cylindrical surface, onto a two-dimensional image plane. The mapping M1, M2, maps spatial points or pixel locations in the image 31 on the three-dimensional surface 34 onto spatial points or pixel locations in the two-dimensional image plane of the image 32a, 32b. The image 31 represented on the three-dimensional surface 34 may, in turn, be obtained by projecting a plurality of images of the scene captured by the camera 16 from different viewing angles. Specifically, the camera 16 may include a plurality of image sensors which are directed in different viewing directions and simultaneously captures images of the scene. From the plurality of images, the image 31 may be generated by stitching the plurality of images together. The stitching of the images typically involves projecting the plurality of images onto a common three-dimensional projection surface, such as surface 34, using information describing how the plurality of image sensors are arranged in relation to each other. This allows pixels in the plurality of images that correspond to the same point in the scene to be projected onto the same point on the three-dimensional surface 34, thereby enabling the plurality of images acquired from different viewing angles to be combined into a stitched image 31.

The mapping M1, M2 of the image 31 on the three-dimensional surface onto the two-dimensional image plane causes lines that were straight in the image 31 to be distorted in the resulting panoramic image 32a, 32b. This is illustrated by the dashed lines in image 31 being distorted when the mappings M1, M2 are applied. However, depending on the choice of the mapping M1, M2, there will be an image portion extending along a horizontal line in the panoramic image 32a, 32b along which there is a reduced, or even no distortion of lines compared to other parts of the panoramic image 32a, 32b. As illustrated in FIG. 3, the position of the horizontal line depends on which mapping is used. When a mapping M1 is used, lines in an image portion along a first horizontal line 33a are caused to have a reduced amount of distortion. If a different mapping M2 is used, lines along a second horizontal line 33b are caused to have a reduced amount of distortion. Thus, by appropriately selecting the mapping M1, M2, one can obtain a panoramic image 32 having a reduced distortion of lines in a desired image portion, such as along a desired horizontal line 33a, 33b. The relation between the mapping and the position of the horizontal level along which lines have a reduced distortion is per se known to the skilled person and is therefore not described herein in more detail. For example, the "Images Warping"-library in OpenCV may be used (https://docs.opencv.org/4.x/d0/dfa/group_stitching_warp.html). In a practical implementation, a look-up table may be constructed which specifies which mapping function M1, M2, to use for a given horizontal line 33a, 33b.

Referring again to the user interface 14 of FIG. 1, the user may input an indication regarding in which image portion of the image the distortion of lines should be reduced. In particular, the user may indicate along which horizontal line in the image the distortion should be reduced. Following such user input, the processing unit 121 may generate a version of the image having a reduced line distortion in that image portion, by applying an appropriate dewarping function or mapping as described above.

Figure 4:
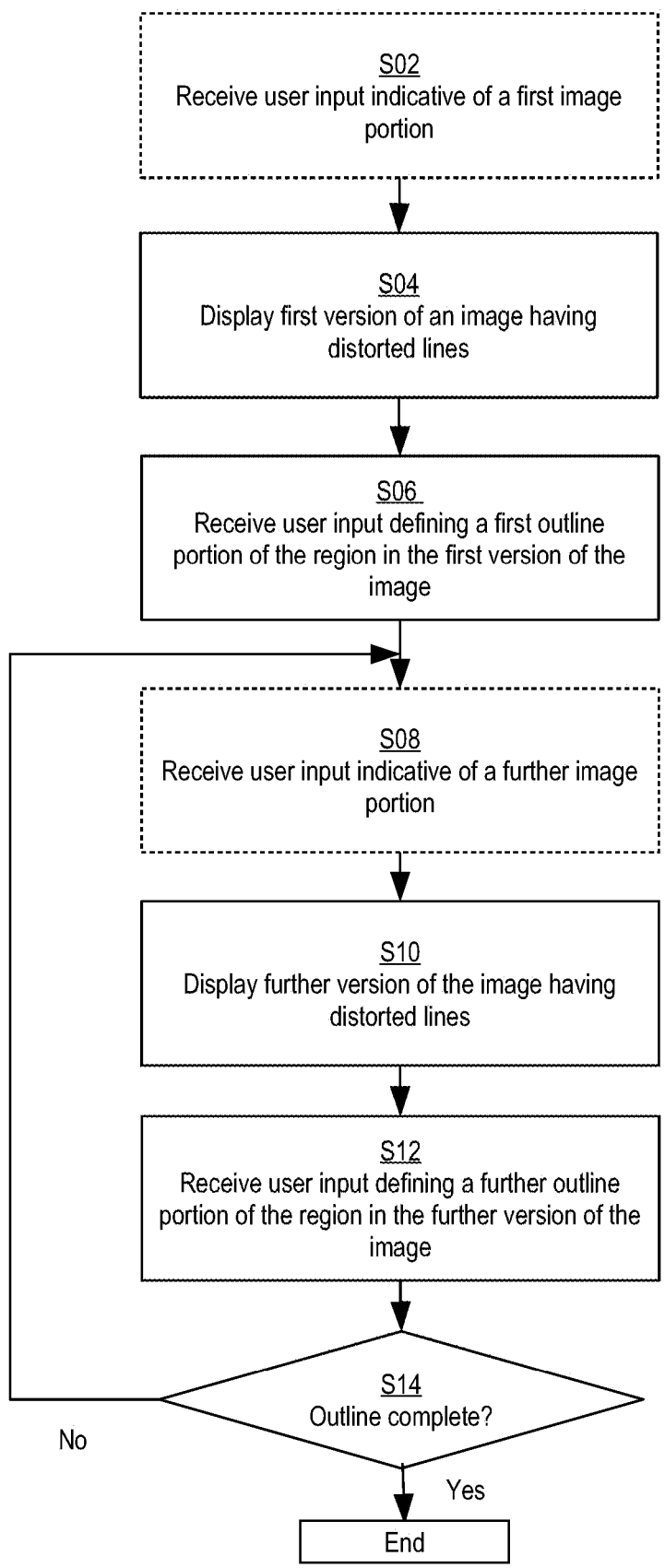
FIG. 4 is a flowchart of a method for defining an outline of a region in an image having distorted lines according to embodiments.

The operation of the system 1 when carrying out a method for defining an outline of a region in an image having distorted lines will now be described with reference to the flow chart of FIG. 4 and further reference to FIGS. 1-3 and FIGS. 5A-B. As explained above, the image may be a panoramic image which is obtained by dewarping a cutout of a wide-angle image using a dewarping function, or by mapping an image represented on a three-dimensional surface onto a two-dimensional image plane.

Figure 5A:
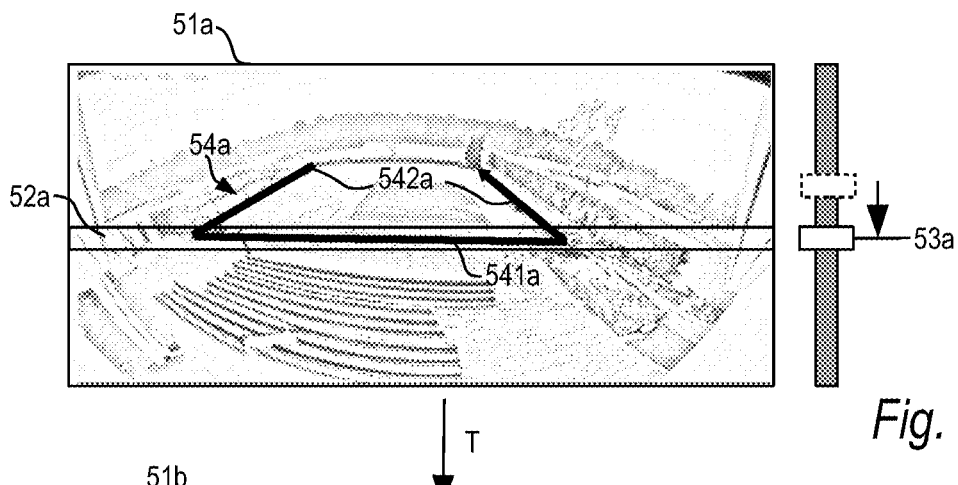
FIGS. 5A-C schematically illustrates a view on a user interface at different stages of the method of the flowchart of FIG. 4.

In step S04, a first version of an image is displayed on the user interface 14, such as in a view area of the graphical user interface 143 on the display 141. The first version of the image is generated by the processing unit 121. In the case of a panoramic image which is obtained by mapping an image represented on a three-dimensional surface onto a two-dimensional image plane, the first version of the image may be generated by using a first mapping M1. In case of a panoramic image which is obtained by dewarping a wide-angle image, the first version of the image may be generated by dewarping the wide-angle image using a first dewarping function f1. FIG. 5A illustrates a first version 51a of an image. The first version 51a of the image is generated so as to have a reduced distortion of lines in a first image portion 52a thereof. This means that the distortion of lines is reduced, i.e., lower in the first image portion 52a compared to other image portions of the first version 51a of the image. This can, e.g., be achieved by an appropriate choice of the first mapping function or the first dewarping function, for example by using a look-up table. In the illustrated example, the first image portion 52a extends horizontally across the first version 51a of the image, i.e., along a first horizontal line. As can be seen, lines in the first image portion 52a are less distorted than lines in other portions of the first version 51a of the image. Differently stated, lines in the first image portion 52a are straightened or rectified. While this effect is more pronounced for horizontal lines in the first version 51a, it also applies to vertical lines in the image. The image portion 52a may correspond to a rectangular image portion as illustrated in FIG. 5A, or even a single horizontal line in the image. However, it is understood that the image portion generally may have any shape and position in the image plane.

In some embodiments, the first version 51a is generated and displayed responsive to a step S02 of receiving user input which is indicative of the first image portion 52a. For example, the user input may be indicative of a vertical level 53a, such as a vertical coordinate, of the first horizontal line along which the first image portion 52a should extend. The vertical level 53a may be input via the graphical user interface, for instance by sliding a slider bar to the desired vertical level as illustrated in FIG. 5A. However, many other ways of providing input which is indicative of the first image portion 52a may be envisaged, including drawing a line or a rectangle in the view area of the graphical user interface. In this way, the user may select in which image portion 52a lines should be straightened. In particular, the user may select the horizon which should be straightened in the panoramic image 52a. In a typical scenario, and as explained below, the user selects an image portion 52a in which he intends to define an outline portion of a region. In the illustrated example, the user indicates an image portion 52a which extends along a lower boundary of a depicted backyard. Responsive to receiving the indication of the first image portion 52a, the processing unit 121 may appropriately select the first dewarping function f1 or the first mapping M1 to have a reduced distortion of lines in the first image portion 52a of the first version 51a of the image, for example by using a look-up table.

In step S06, user input defining a first outline portion 54a of a region in the first version 51a of the image is received by the processing unit 121 via the user interface 14. For example, the user may define the first outline portion 54a by drawing lines in the first version 51a of the image. As illustrated, the first outline portion 54a may be displayed together with the first version 51a of the image on the user interface 14. For example, the processing unit 121 may render a first overlay image depicting the first outline portion 54a. By way of example, pixels belonging to the first outline portion 54a may be assigned a predefined pixel value, such as the value 255 in the first overlay image. The first overlay image may then be displayed together with the first version 51a, by overlaying the first overlay image on the first version 51a of the image. In some embodiments, the first overlay image may be stored in a buffer for future use, as will be explained in more detail further below.

The input of the first outline portion 54a is facilitated by the fact that lines in the first portion 52a of the first version 51a of the image have a reduced distortion. Thus, the user may specifically define the first outline portion 54a to include one or more lines 541a in the first image portion 52a. When the first image portion 52a extends along a horizontal line as illustrated in FIG. 5A, these one or more lines 541a will hence extend in a predominantly horizontal direction in the first version 51a of the image. As further illustrated in FIG. 5A, the first outline portion 54a may also include one or more lines 542a which extend outside of the first image portion 52a in the first version 51a of the image. The one or more lines 542a may, for instance, correspond to lines in the scene which extends in a predominantly vertical direction.

Typically, in panoramic images of the type described herein, the distortion of horizontal lines in the scene is much worse than the distortion of vertical lines in the scene. Therefore, the need for reducing the distortion of vertical lines in the scene, or lines with a predominant vertical direction, prior to defining the first outline portion 54a is not as important as for horizontal lines in the scene.

In step S10 of the method, a further version 51b of the image is displayed on the user interface 14, such as in a view area of the graphical user interface 143 on the display 141. The further version 51b of the image is generated by the processing unit 121. In the case of a panoramic image which is obtained by mapping an image represented on a three-dimensional surface onto a two-dimensional image plane, the further version 51b of the image may be generated by using a mapping M2 which is different from the first mapping M1 used to generate the first version 51a of the image. In case of a panoramic image which is obtained by dewarping a wide-angle image, the further version 51b of the image may be generated by dewarping the wide-angle image using a further dewarping function f2, which is different from the dewarping function f1 used to generate the first version of the image.

The further version 51b of the image is generated so as to have a reduced distortion of lines in a further image portion 52b of the further version 51b. The further image portion 52b is different from the first image portion 52a of the first version 51a. This means that the distortion of lines is reduced, i.e., lowered in the further image portion 52a compared to other image portions of the further version 51a of the image. This can, e.g., be achieved by an appropriate choice of the further mapping M2 or the further dewarping function f2, for instance by using a look-up table. In the illustrated example, the further image portion 52b extends horizontally across the further version 51b of the image, i.e., along a further horizontal line in the further version 51b of the image. In this case, the further image portion 52b corresponds to an upper boundary of the depicted backyard. As can be seen, lines in the further image portion 52b are less distorted than lines in other portions of the further version 51b of the image. Further, lines in the further image portion 52b are less distorted than they were in the corresponding spatial portion of the first version 51a of the image.

Figure 5B:
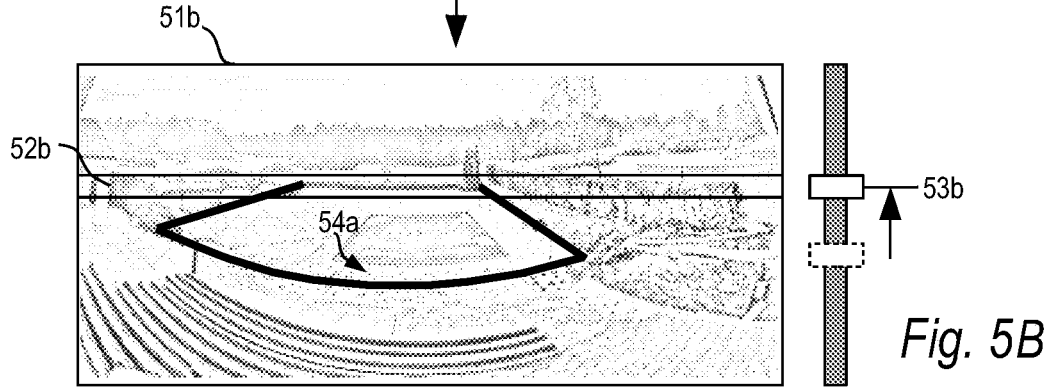

In some embodiments, the further version 51b is generated and displayed responsive to a step S08 of receiving user input which is indicative of the further image portion 52b. For example, the user input may be indicative of a vertical level 53b, such as a vertical coordinate, of the further horizontal line along which the further image portion 52b should extend. Similar to what was explained in connection to step S02, the vertical level 53b may for instance be input via the graphical user interface by sliding a slider bar to the desired vertical level as illustrated in FIG. 5B. Responsive to receiving the indication of the further image portion 52b, the processing unit 121 may appropriately select the further dewarping function f2 or the further mapping M2 that will yield a reduced distortion of lines in the further image portion 52b of the further version 51b of the image.

To enhance the user experience, it is desirable to display the first outline portion 54a together with the further version 51b of the image. However, before doing so, the first outline portion 54a needs to be transformed to map its pixel locations which are defined in the image plane of the first version 51a of the image to corresponding pixel locations in the image plane of the further version 51b of the image. Generally, the further version 51b of the image may be seen as a spatial transformation T of the first version 51a of the image. In particular, the transformation T maps spatial positions or pixel locations in the first version 51a of the image to corresponding spatial positions or pixel locations in the second version 51b of the image. In case the first and second versions of the image are generated by applying dewarping functions f1 and f2, respectively, to a wide-angle image, the transformation T is given by $T=f2(f1)^{-1}$. In case the first and the second versions of the image are generated by applying mappings M1 and M2, respectively to an image represented on a surface in a three-dimensional space, the transformation T is given by $T=M2(M1)^{-1}$. By transforming the first outline portion 54a using transformation T, i.e., by mapping the pixel locations of the first outline portion 54a in the first version 51a of the image, it may be represented in the coordinate system of the further version of the image 54b. As a result, as illustrated in FIG. 5B, the transformed first outline portion can be displayed together with the further version 51b of the image. In this way, outline portions defined in a previously displayed version of the image can be moved along to a currently displayed version of the image.

Different approaches may be taken for transforming the first outline portion 54a and displaying it together with the further version 51b of the image.

In a first approach, the first outline portion 54a as defined in the first version 51a has a vector representation. This means that the lines 541a and 542a constituting the first outline portion 54a each are represented by a vector having a magnitude and a direction. Starting from this vector representation, the processing unit 121 may determine a first plurality of spatial points which are located subsequently along the first outline portion 54a. For the purpose of transforming the first outline portion 54a, the first plurality of points may be used to represent the first outline portion 54a. In order to transform the first outline portion, the processing unit 121 then applies the transformation T to the first plurality of points so that corresponding spatial points in the second version of the image 51b are found. If needed, more points may be added after hand to represent the first outline portion 54a. Particularly, this may be needed if it is found that, after application of the transformation T, points that were located along a certain line segment in the first version 51a deviates from being located along a line segment when transformed to the second transformed view 51b. If so, it is an indication that more points should be added to represent that line segment. When added, the transformation T may be used to transform the additional points. Thus, one can start from a low number of points, such as three per line segment, and add more points when needed.

Having transformed the point representation of the first outline portion 54a to the coordinate system of the second transformed view 51b, a vector representation of the first outline portion 54a in the coordinate system of the second transformed view 51b may be defined in terms of vectors joining subsequent points among the transformed first plurality of points. In order to display the transformed first outline portion 54a, the processing unit 121 may then render a further overlay image in which the transformed first plurality of points are interconnected by lines. The further overlay image may then be displayed together with the second transformed view 51b by overlaying it on the second transformed view 51b as illustrated in FIG. 5B.

In a second approach, the processing unit 121 does not apply the transformation T to an underlying representation of the first outline portion 54a. Instead, it operates to transform the first overlay image which depicts the first outline portion 51a in the coordinate system of the first version 51a using the transformation T. As further mentioned above, such first overlay image was typically rendered in connection to being displayed together with the first version 51a, and may be retrieved from a buffer. For instance, the pixel locations of the pixels in the first overlay image may be mapped using the transformation T to corresponding pixel locations in the second version 51b of the image. In this way, a further overlay image which depicts the first outline portion 51a in the coordinate system or image plane of the second transformed view 51b is generated. The second overlay image may be added to the buffer and displayed as an overlay together with the second version 51b of the image as shown in FIG. 5B.

Next, in step S12, the processing unit 121 receives user input defining a further outline portion 54b of the region in the further version 51b of the image via the user interface 14. Similarly to what was explained in connection to the first outline portion 54a, the user may define the further outline portion 54b by drawing lines in the further version 51b of the image.

Figure 5C:
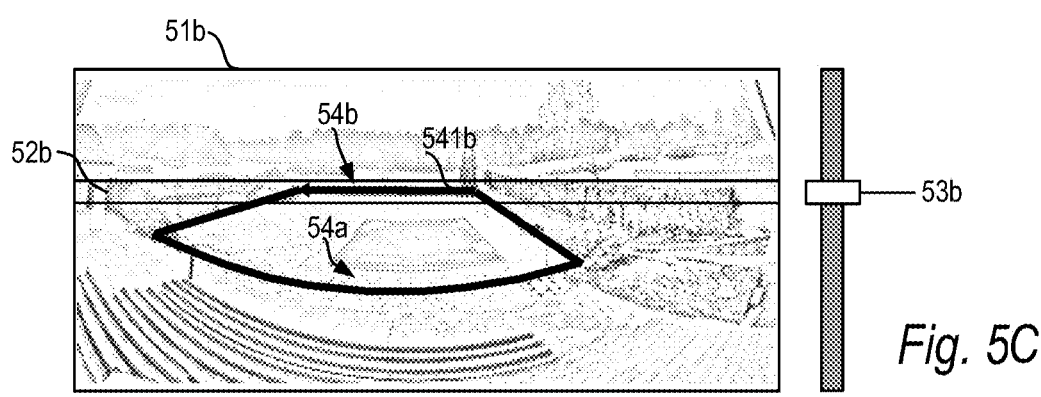

The input of the further outline portion 54b is facilitated by the fact that lines in the further portion 52b of the further version 51b of the image have a reduced distortion. Thus, the user may at this stage of the method conveniently define the further outline portion 54b to include one or more lines 541b in the further image portion 52b. In the illustrated case where the further image portion 52b extends along a further horizontal line as illustrated in FIG. 5C, these one or more lines 541b will hence extend in a predominantly horizontal direction in the further version 51b. Although not illustrated in the example of FIG. 5C it is understood that the further outline portion 54b also may include one or more lines which extend outside of the further image portion 52b in the further version 51b of the image.

The processing unit 121 may merge the further outline portion 54b with any previously received outline portion into a common representation of the outline of the region. In the illustrated example, the processing unit 121 may hence merge the further outline portion 54b with the first outline portion 54a. In order to merge the outline portions 54a and 54b, they need to be represented in the same coordinate system or image plane. Thus, prior to merging, the outline portions 54a and 54b should be transformed to the same coordinate system. That coordinate system could in some embodiments be the coordinate system of the further version 51b of the image. In that case, the processing unit 121 will hence merge the transformed version of the first outline portion 54a with the further outline portion 54b into a common representation of the outline described in the coordinate system of the further version 51b of the image. In other embodiments, the merging could instead be performed in the coordinate system of the first version 51a. In yet other embodiments, the merging could be performed in the coordinate system of the raw image data, such as in the coordinate system of the wide-angle image 21 of FIG. 2 or the image 31 represented on the three-dimensional surface in FIG. 3.

If the first outline portion 54a and the further outline portion 54a have a vector or point representation, the processing unit 121 could merge the vector or point representations into a common representation. By way of example, the vector or point representation of the first outline portion 54a when transformed to the coordinate system of the further version 51b of the image could be merged with a vector or point representation of the further outline portion 54b.

As an alternative, if the transformed version of the first outline portion 54a is represented by the further overlay image described above, the processing unit 121 may add the further outline portion 54b to the same overlay image. For example, pixels in the further overlay image that belong to the further outline portion 54b could also be given a predetermined pixel value, such as the value 255. In that way, the further overlay will serve as a common representation of the first outline portion and the further outline portion. By applying a scan-line algorithm to the further overlay the processing unit 121 may determine which pixel locations are inside the region defined by the outline, and which are outside of the region. This may for example be used to deduce if a pixel location is within an alarm or analytics zone, or to fill in pixel locations within the region in the overlay for privacy masking purposes. The scan-line algorithm may also be used to convert an overlay image of one or more outline portions to a point or vector representation of the outline portion(s).

As illustrated in FIG. 5C, the further outline portion 54b and the transformed version of the first outline portion 54a may be displayed in the user interface 14 together with the further version 51b of the image. For example, the processing unit 121 may display the further version 51b of the image together with an overlay which depicts both the transformed version of the first outline portion 54a and the further outline portion 54b.

In step S14, the processing unit 121 may then check whether the outline of the region has been completely defined, i.e., whether the user has defined all portions of the outline. For example, the user may provide input to the processing unit 121 via the user interface 14 when the region is complete. If it is found that the outline is not completely defined, steps S08, S10, S12 are repeated until the user has defined the whole outline of the region. If the outline is completely defined, no further versions of the image are presented to the user. This is the case in the example of FIGS. 5A-C where the outline is completely defined by the first outline portion 54a and the second outline portion 54b. Accordingly, when the outline has been completely defined, the outline is composed of the outline portions 54a, 54b defined via user input in different transformed views 51a, 51b of the image. At this stage the representation of the outline portions may be transformed to a reference coordinate system. Such a reference coordinate system may correspond to a predetermined reference mapping Mref or reference dewarping function fref.

It will be appreciated that a person skilled in the art can modify the above-described embodiments in many ways and still use the advantages of the disclosure as shown in the embodiments above. Thus, the disclosure should not be limited to the shown embodiments but should only be defined by the appended claims. Additionally, as the skilled person understands, the shown embodiments may be combined.

The invention claimed is:

1. A method for defining an outline of a region in an image having distorted lines, characterized by an iterative process comprising:
displaying a first version of the image having distorted lines, wherein first lines in a first image portion of the first version of the image are straightened based upon 100% distortion correction of the distorted lines in the first image portion of the first version of the image so that the first lines in the first image portion are less distorted than second lines in other portions of the first version of the image, receiving user input defining a first outline portion of the outline of the region in the first version of the image, wherein the first outline portion includes one or more of the first lines in the first image portion of the first version of the image, displaying a further version of the image having distorted lines, wherein further first lines in a further image portion of the further version of the image are straightened based upon 100% distortion correction of the distorted lines in the further image portion of the further version of the image so that the further first lines in the further image portion are less distorted than further second lines in other portions of the further version of the image, and wherein the further image portion is different from the first image portion, and receiving user input defining a further outline portion of the outline of the region in the further version of the image, wherein the further outline portion includes one or more of the further first lines in the further image portion of the further version of the image.

2. The method of claim 1, further comprising:
repeating the steps of displaying a further version of the image and receiving user input defining a further outline portion of the outline of the region until the outline of the region is completely defined.

3. The method of claim 1, wherein the first image portion extends along a first horizontal line in the first version of the image and the further image portion extends along a further horizontal line in the further version of the image.

4. The method of claim 1, wherein displaying the first version of the image is made in response to receiving a user input indicative of the first image portion, and displaying the further version of the image is made in response to receiving a user input indicative of the further image portion.

5. The method of claim 1, further comprising:
transforming the first outline portion defined in the first version of the image using a transformation between the first version of the image and the further version of the image.

6. The method of claim 5, further comprising:
displaying the transformed first outline portion together with the further version of the image.

7. The method of claim 5, further comprising:
merging the transformed first outline portion and the further outline portion defined in the further version of the image into a common representation of the outline in the further version of the image.

8. The method of claim 5, wherein the first outline portion defined in the first version of the image is represented by a first plurality of points, and wherein the first outline portion is transformed by transforming the first plurality of points using the transformation.

9. The method of claim 5, further comprising rendering a first overlay image of the first outline portion defined in the first version of the image, wherein the first outline portion is transformed by applying the transformation to the rendered first overlay image.

10. The method of claim 1, further comprising:
displaying the first outline portion together with the first version of the image, and displaying the further outline portion together with the further version of the image.

11. The method of claim 1, wherein the first version and the further version of the image are obtained by mapping an image represented on a three-dimensional surface onto a two-dimensional image plane using a first mapping function and a further mapping function, respectively.

12. The method of claim 1, wherein the first version of the image and the further version of the image are obtained by dewarping a cutout of a wide-angle image using a first dewarping function and a further dewarping function, respectively.

13. The method of claim 1, further comprising:
using the region in the further version of the image as an include or exclude zone for alarms, privacy masking, loitering detection, and/or object detection.

14. The method of claim 1, wherein the image having distorted lines is generated by stitching together a plurality of images which capture a scene from different viewing angles.

15. A system for defining an outline of a region in an image having distorted lines, characterized by an iterative process comprising:
a processing unit arranged to calculate a first version of the image having distorted lines, wherein first lines in a first image portion of the first version of the image are straightened based upon 100% distortion correction of the distorted lines in the first image portion of the first version of the image so that the first lines in the first image portion are less distorted than second lines in other portions of the first version of the image, and calculate a further version of the image having distorted lines, wherein further first lines in a further image portion of the further version of the image are straightened based upon 100% distortion correction of the distorted lines in the further image portion of the further version of the image so that the further first lines in the further image portion are less distorted than further second lines in other portions of the further version of the image, and wherein the further image portion is different from the first image portion, a user interface arranged to display the first version of the image and receive user input defining a first outline portion of the outline of the region in the first version of the image, wherein the first outline portion includes one or more of the first lines in the first image portion of the first version of the image, and to display the further version of the image and receive user input defining a further outline portion of the outline of the region in the further version of the image, wherein the further outline portion includes one or more of the further first lines in the further image portion of the further version of the image.

16. A non-transitory computer-readable medium comprising computer-code instructions which, when executed by a processing device, causes the processing device to carry out a method for defining an outline of a region in an image having distorted lines, characterized by an iterative process comprising:
displaying a first version of the image having distorted lines, wherein first lines in a first image portion of the first version of the image are straightened based upon 100% distortion correction of the distorted lines in the first image portion of the first version of the image so that the first lines in the first image portion are less distorted than second lines in other portions of the first version of the image, receiving user input defining a first outline portion of the outline of the region in the first version of the image, wherein the first outline portion includes one or more of the first lines in the first image portion of the first version of the image, displaying a further version of the image having distorted lines, wherein further first lines in a further image portion of the further version of the image are straightened based upon 100% distortion correction of the distorted lines in the further image portion of the further version of the image so that the further first lines in the further image portion are less distorted than further second lines in other portions of the further version of the image, and wherein the further image portion is different from the first image portion, and receiving user input defining a further outline portion of the outline of the region in the further version of the image, wherein the further outline portion includes one or more lines in the further image portion of the further version of the image.

\* \* \* \* \*